US006285373B1

(12) United States Patent
Baldwin et al.

(10) Patent No.: US 6,285,373 B1
(45) Date of Patent: *Sep. 4, 2001

(54) METHOD AND APPARATUS FOR TEXTURE TRANSMISSION AND STORAGE

(75) Inventors: David Robert Baldwin, Weybridge; Andrew Bigos, Staines; Osman Kent, Thames Ditton; Nicholas J. N. Murphy, The Sands, all of (GB)

(73) Assignee: 3Dlabs Inc. Ltd. (BM)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/823,753

(22) Filed: Mar. 25, 1997

Related U.S. Application Data

(60) Provisional application No. 60/014,339, filed on Mar. 29, 1996.

(51) Int. Cl.[7] ............................................ G06T 11/40
(52) U.S. Cl. ............................... 345/430; 345/425
(58) Field of Search ................................. 345/430, 425, 345/502–504, 522, 526, 506

(56) References Cited

U.S. PATENT DOCUMENTS

| 5,485,559 | * | 1/1996 | Sakaibara et al. | 345/433 |
|---|---|---|---|---|
| 5,546,530 | * | 8/1996 | Grimaud et al. | 395/163 |
| 5,675,773 | * | 10/1997 | Devic | 395/503 |
| 5,727,190 | * | 3/1998 | Derby et al. | 395/503 |
| 5,772,297 | * | 6/1998 | Loo et al. | 345/419 |
| 5,774,132 | * | 6/1998 | Uchiyama | 345/503 |
| 5,790,134 | * | 8/1998 | Lentz | 345/501 |
| 5,822,591 | * | 10/1998 | Hochmuth | 395/705 |
| 5,864,680 | * | 1/1999 | Edblad et al. | 395/200.72 |
| 5,886,706 | * | 3/1999 | Alcorn et al. | 345/430 |

OTHER PUBLICATIONS

Heckbert, Paul S., "Fundamentals of Texture Maping and Image Warping", Thesis submitted to Dept of EE and Computer Science, Univ of California, Berkeley, Jun. 17, 1989, p. 1–86.

Foley et al., "Computer Graphics:Principles and Practice" 2 ed. 1990, corr. 1995 especially at pp. 741–744.

Heckbert,Paul "Survey of Texture Mapping", IEEE Computer Graphics, Nov. 1986, pp. 56–66.

* cited by examiner

*Primary Examiner*—Jeffery Brier
*Assistant Examiner*—Motilewa Good-Johnson
(74) *Attorney, Agent, or Firm*—Groover & Associates; Robert Groover; Betty Formby

(57) ABSTRACT

A system and method for computer graphics generation which uses a local library of graphics textures. When an application, run either locally or over a communications system, requires texture-mapped graphics, texture data is retrieved from the local library instead of transmitted to the system.

16 Claims, 3 Drawing Sheets

METHOD AND APPARATUS FOR TEXTURE TRANSMISSION AND STORAGE

This application claims priority from U.S. provisional application 60/014,339, filed 03/29/96.

BACKGROUND AND SUMMARY OF THE INVENTION

This application related to computer graphics generation, and specifically to the storage and generation of three-dimensional computer graphics texture data.

Texture mapping is an important part of 3D graphics. In its simplest form texture mapping involves the mapping of a digital texture image onto a 3 dimensional surface. The texture adds detail and realism to the surface appearance. A typical graphics system reads data from a texture map, processes it, and writes color data to display memory. The processing may include mipmap filtering which requires access to several maps. The texture map need not be limited to colors, but can hold other information that can be applied to a surface to affect its appearance; this could include height perturbation to give the effect of roughness. The individual elements of a texture map are called "texels."

Since the surfaces are transformed (by the host or geometry engine) to produce a 2D view, the textures will need to be similarly transformed by a linear transform (normally projective or "affine"). (In conventional terminology, the coordinates of the object surface, i.e. the primitive being rendered, are referred to as an (s,t) coordinate space, and the map of the stored texture is referred to a (u,v) coordinate space.) The transformation in the resulting mapping means that a horizontal line in the (x,y) display space is very likely to correspond to a slanted line in the (u,v) space of the texture map, and hence many page breaks will occur, due to the texturing operation, as rendering walks along a horizontal line of pixels.

Texture patterns are commonly used as a way to apply realistic visual detail at the sub-polygon level. See Foley et al., COMPUTER GRAPHICS: PRINCIPLES AND PRACTICE (2.ed. 1990, corr. 1995), especially at pages 741–744; Paul S. Heckbert, "Fundamentals of Texture Mapping and Image Warping," Thesis submitted to Dept. of EE and Computer Science, University of California, Berkeley, Jun. 17, 1994; Heckbert, "Survey of Computer Graphics," IEEE Computer Graphics, November 1986, pp.56ff; all of which are hereby incorporated by reference.

A recurrent problem with texture mapping is the amount of data each texture map contains. If it is of high quality and detail it may require a substantial amount of storage space. The size of texture maps may be greatly increased if mipmap filtering is supported.

Mip Mapping is a technique to allow the efficient filtering of texture maps when the projected area of the fragment covers more than one texel (i.e. minification). A hierarchy of texture maps is held with each one being half the size (or one quarter the area) of the preceding one. A pair of maps are selected, based on the projected area of the texture. In terms of filtering this means that three filter operations are performed: one on the first map, one on the second map and one between the maps. The first filter name (Nearest or Linear) in the mipmap name specifies the filtering to do on the two maps, and the second filter name specifies the filtering to do between maps.

The filtering process takes a number of texels and interpolants, and with the current texture filter mode produces a texture color.

Moving textures from one place to another may be a time consuming operation. In a normal graphics system the time taken to transfer a texture from disk or system memory to the graphics system may be significantly more than the time taken to apply the texture. Network applications, in which the application and graphics system are on separate machines linked by a low bandwidth connection amplify this problem. Improvements can be made by caching the texture locally in the graphics system, but the time taken to transfer it just once may be prohibitive.

BACKGROUND

Graphics in Telecommunications

As interactive telecommunications become more pervasive, it becomes increasingly important to limit required bandwidth as much as possible while providing a high-quality appearance.

The use of three-dimensional graphics is becoming common in many applications, ranging from business applications, to gaming software, to 3D "web page" graphics. More detailed graphics necessarily require a greater amount of data to produce, and interactive 3D graphics require a very large amount of data per displayed pixel. For telecommunications applications, the amount of data that can be displayed in a reasonable amount of time is limited, so it is commonly unworkable to transmit 3D texture data.

BACKGROUND

Typographic Font Libraries

It has become common in current computer systems to store on each system a library of typographic font descriptions for commonly used typefaces. By doing so, it is unnecessary for each software application to provide a full description of each font it uses; it simply makes reference to the common font library, indicating the required font set and character number. The same font library is also used for common non-typographic character sets, e.g. the common "dingbats" font. By using these font libraries, it is possible to cut down on the bandwidth required for transmitting text to be displayed in a particular font.

Innovative Texture Generation and Storage System

The present application discloses a texture library system and method which removes the need to transfer the complete texture from the application to the drawing engine. Instead, the application sends a reference which the graphics system understands and uses to select a local texture map. The exact texture used by the drawing engine is not known to the application, but industry agreement ensures that a particular reference will produce adequately similar results on compliant systems.

The texture library is a mechanism for reducing the amount of information that needs to be transferred between an application and a graphics system when displaying three dimensional graphics. It gives benefits to suppliers of applications because performance can be greatly improved. It also gives benefits to suppliers of graphics systems because it conceals the format of textures; in this way, graphics systems will only be required to accept textures in library format, with normalized dimensions, and will not be required to design systems to accommodate varying texture formats.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation), in which:

The preferred embodiment provides a system for retrieving a texture map locally for use with an application which may be run either remotely or locally. A library of texture maps is preferably stored on a secondary storage device such as a hard disk drive, but may be stored in a ROM, FLASH EEPROM, or other memory.

Figure 1:
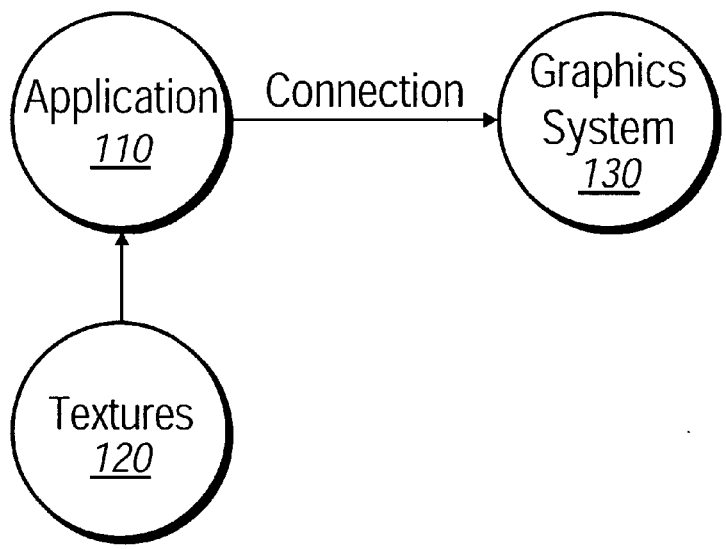
FIG. 1 shows a high-level view of a traditional graphics computer system.

FIG. 1 shows a traditional system in which the texture data is stored with the application. The application 110 stores its required textures 120 on the remote system, and transmits both the textures and other data to the local graphics system 130 when the application is executed. This necessitates the transmission of the texture to the graphics system before they can be used.

By keeping a library of common textures on the local system, the application being executed is no longer required, as in conventional systems, to provide each individual texture. Instead, when a texture is required, an index value is provided to the retrieval subsystem, which retrieves and returns the required texture map. In this manner, a texture map which could easily span thousands of bytes may be specified with a single index value, which references the appropriate library and entry. As a result, the bandwidth required to execute the application in from a remote system, or the space needed to store the application, is dramatically reduced.

Figure 2:
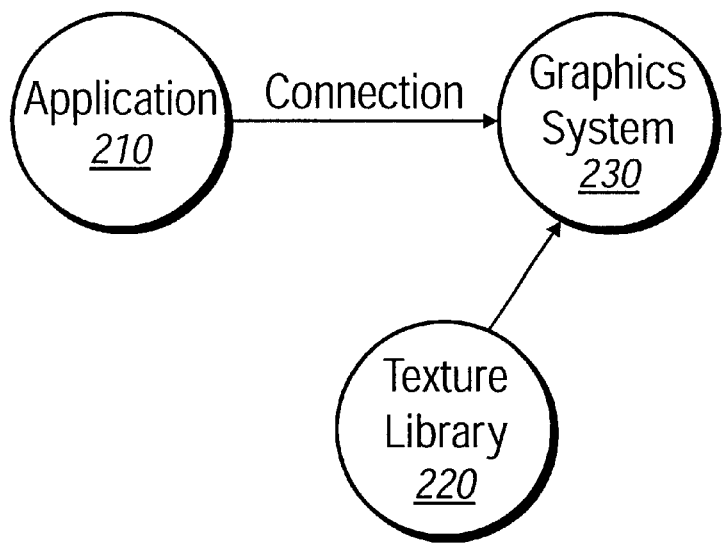
FIG. 2 shows a high-level view of a graphics computer system according to the preferred embodiment.

FIG. 2 shows a conceptual diagram of a system according to the preferred embodiment, wherein the texture data is stored with the local graphics system. When the application 210 seeks to generate a texture-mapped image, texture identifiers are sent to the local graphics system 230. The local graphics system then retrieves the textures 220 locally and displays the desired image. Therefore, the application needs to send only a reference for the texture to become available.

Each texture map may be of virtually any size, and the actual dimensions of the texture, and the number of bits in each texel, is unimportant to the application. Each texture map, regardless of size, is normalized as it is mapped onto the 3D object. Therefore, as the dimension of the stored texture map increases, so does the resolution and quality of the displayed image. Naturally, larger texture maps will require a greater amount of storage, so the user, in one embodiment, may choose to store a small, low resolution texture to conserve space, or a corresponding large, high resolution texture map to improve the appearance of the displayed image. Similarly, the bit length of each texel is unimportant to the application, and can be, e.g. 32 bits wide, at 8 bits each for the RGBA components. Optionally, the texel length can be longer for greater color precision, or may be a short index value to a color look-up table. The calling application simply receives the appropriate stored texture, in normalized dimensions, without regard to the actual dimension of the texture map or length of the individual texels.

In one embodiment, the application can make suggestions to the texture library to trade speed for quality, by using a higher resolution version of corresponding texture maps instead of a lower resolution version, or to trade quality for speed by doing the opposite. The local system is free to ignore these suggestions according to user preference.

The textures may contain information that marks the visibility of individual texels within the texture map. This may be in the form of opacity or transparency information; alternatively a texel may be either visible or invisible based on a flag or a specific color value.

The application sends drawing commands to the local system, which may be at the other end of a low bandwidth connection. When a texture is required, if it is not a standard texture it is transmitted to the application as an image; if it is a standard texture and part of the library a reference is sent instead. The graphics system uses the reference to select an appropriate texture from local storage. In an alternative embodiment, a set of variables may be sent to the application to be used as operators in a texture synthesis process.

In one embodiment, when a texture is required to be transmitted from a remote system to a local system, e.g. when it is a non-standard texture, this transmission can be performed as a progressive refinement to the target texture. In this way, the initial delay of the availability of the texture to the local system, i.e. latency, is reduced by first transmitting a low resolution version of the texture, then increasing the quality of the texture over time.

The local texture retrieval subsystem is therefore called by the system whenever the application requires a texture that is index-referenced rather than fully specified. In the preferred embodiment, the subsystem simply retrieves the texture map which corresponds to the index value.

The reference may be a name, an index, a code made up of several levels of index incorporating classifications, or some other identifier. The reference may indicate two dimensional textures, three dimensional textures or moving textures consisting of a sequence of textures. The reference for a moving texture may also contain additional information on how the sequence should be played.

The drawing engine is free to produce a texture specified by a reference in whatever form is most suitable. This includes the color format, resolution and any filtering of the texture. The local texture may be stored on disk, in volatile memory, or nonvolatile memory as required. It may be stored in a format ready for use, or compressed, or as parameters for synthesis. The format and method of storage of local textures is transparent to the application, giving providers of graphics systems greater flexibility and scope for innovation.

If the application is being executed locally, there is little difference in the time required to execute the application with the preferred system than without; in either case the application would have retrieved the texture from local storage for mapping. In this case, a significant advantage of the present system is that the application is not required to furnish the textures, so the amount of space need to store the application in secondary storage or on portable media is reduced. This advantage is increased as more applications are added to the system; it becomes unnecessary for each application to store its own copy of common textures. By using the texture library of the present system, redundant information is minimized and the system storage efficiency is increased.

If the application is being executed remotely, in whole or in part, e.g. over the internet, the advantages of the present system are even more pronounced. As discussed above, keeping the required band-width of an application to a minimum enhances the usability (or playability) of an application. By employing a texture library as disclosed, it is unnecessary for some or any of the texture data to be transmitted between computers, since it can be retrieved locally from the texture library.

As previously noted, textures can take a significant amount of storage that may be expensive or in short supply. Compressing the texture reduces the storage it takes, and can improve drawing performance as less data needs to be read by the graphics system. The format that a local texture is stored in is transparent to the application, and decompression may take place either as the texture is loaded, or texel by texel as required.

The preferred embodiment provides for a library of texture maps, but similar advantages are gained through the use of an alternative embodiment, in which at least some of the textures required by the retrieval system are synthesized on the fly. This process is preferably invisible to the calling application; if the application calls for a texture, the texture either retrieved or synthesized and returned to the calling application. In a preferred embodiment, a synthesized texture will require no more input from the calling application than a retrieved texture. In another embodiment, the calling application can pass other variables, e.g. relating to coloration or rotation, in addition to the texture index value. In this way, the texture can be manipulated as it is being produced.

Synthesis of textures, either as a result of processing a base image or from a set of parameters, may be considered another form of compression. It may also be used to generate texture maps at the correct level of detail for the surface being drawn; this avoids filtering, reduces storage, and improves performance. Local textures may be synthesized as their format is transparent to the application.

Synthesis and compression may be combined. For example, a compressed texture may form the basis for synthesis of the texture map to greater detail, or the synthesis of other texture maps to be used in filtering.

According to the preferred embodiment, the texture library itself is organized into categories and subcategories, according to the general appearance of each texture. For example, a broad category might represent textures that resemble stone, with a subcategory of granites. By limiting the number of categories, an unknown texture or subcategory is guaranteed to find a default match at the category level.

The texture library is intended to be relatively standard across computer systems, so that when a texture index is received and the corresponding texture retrieved, the resulting image corresponds to the image intended by the application. The library is expandable, and new subcategories and textures can be added. Because the textures are organized by similar appearance, if the retrieval system receives a request for a texture that is not present on the local system, another texture from the same category or subcategory may be substituted. This will result in an image very similar to the intended image, and allows the system to operate even when a specific texture is unavailable.

In an alternative embodiment, the texture is optionally scaled, rotated, or otherwise manipulated as it is being retrieved, or immediately after synthesis. These modifications are performed using known techniques on the texture maps.

Figure 3:
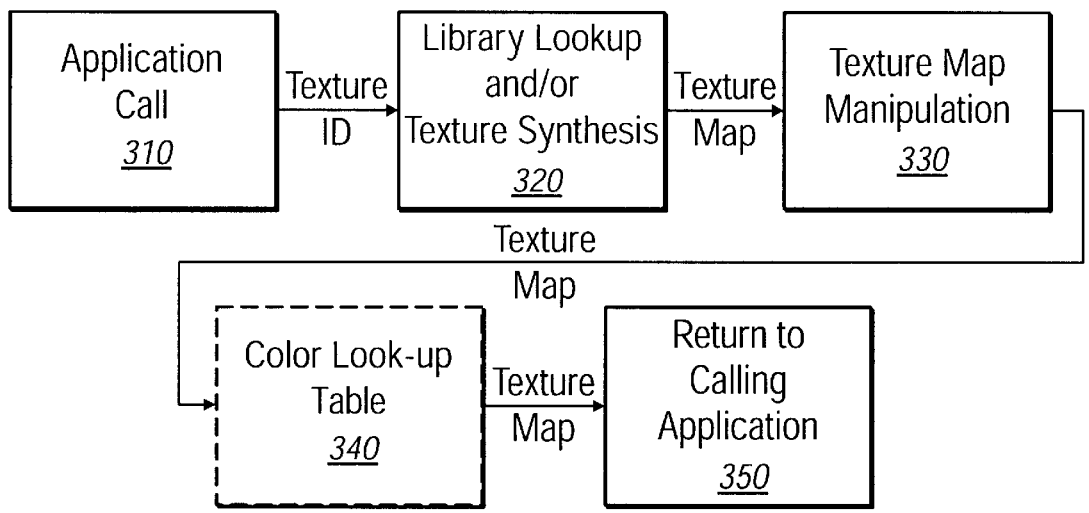
FIG. 3 shows a flow-chart of the process for obtaining a texture map according to the preferred embodiment.

FIG. 3 shows a flowchart of the claimed retrieval system. After the application calls 310 for a texture, it is either retrieved or synthesized 320, depending on the type of call, according the texture identifier passed. The texture map is then optionally manipulated 330, as described above. Next, the texture is optionally processed through a color look-up table 340, and is then returned to the calling application 350.

The actual processing may take place in the local CPU, in a graphics processor, or both. In the preferred embodiment, the local CPU manages the retrieval or synthesis of the texture, and the graphics processor then performs any manipulation, and maps the texture to the three dimensional object, under the control of the calling application.

Figure 4:
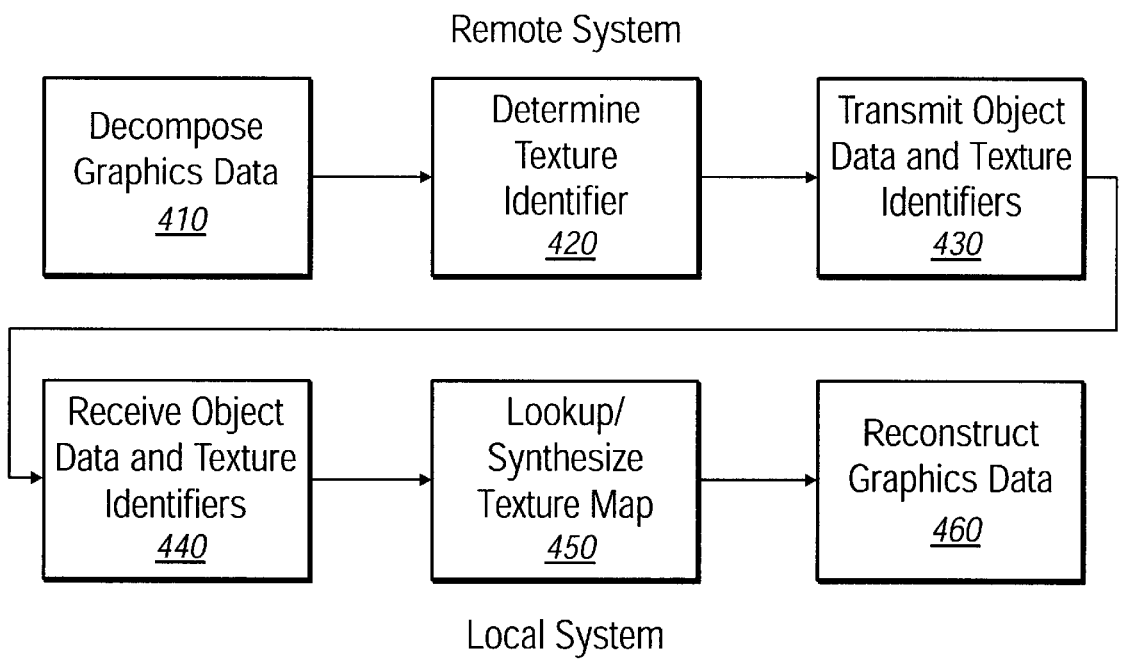
FIG. 4 shows a flow-chart of the process of transmitting data between a remote system and a local system.

FIG. 4 shows a flow-chart of the process of transmitting data between a remote system and a local system. On the remote system, graphics data is decomposed 410 into object data and texture data. Next, the remote texture library is referenced to determine the texture identifier(s) 420 which corresponds to the texture data. The remote system then transmits the object data and texture identifiers 430 to the local system. When they are received by the local system 440, the texture identifiers are used to look up and/or synthesize a texture map 450 that generally corresponds to the original texture data. Finally, the texture map and object data are combined to reconstruct the original graphics data 460.

Figure 5:
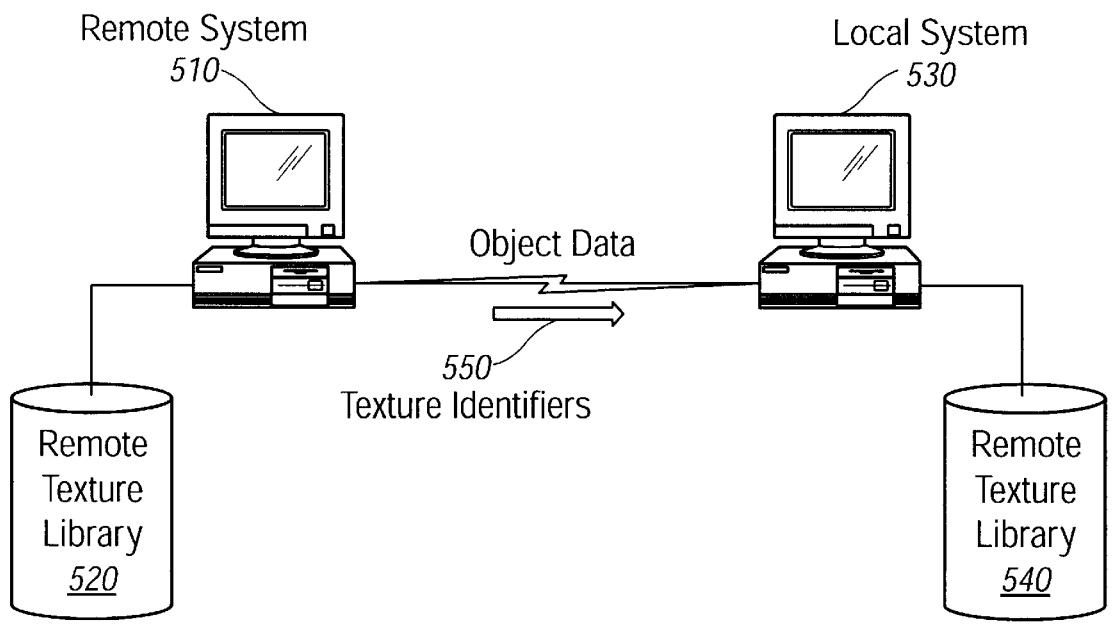
FIG. 5 shows a high-level view of communications between a remote system and a local system.

FIG. 5 shows a high-level view of communications between a remote system and a local system. As described above, the remote system 510 references the remote texture library 520 to determine the applicable texture identifiers. These identifiers and other object data are sent to the local system 530. The local system then displayed the desired image by using texture maps from the local texture library 540.

Figure 6:
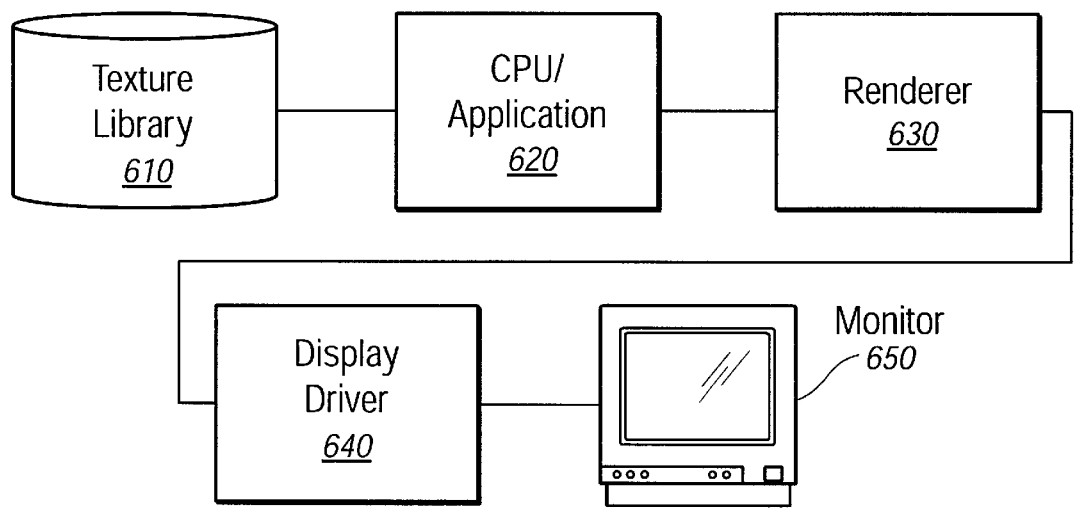
FIG. 6 shows a high level view of the display system of a graphics computer system.

FIG. 6 shows a high level view of the display system of a graphics computer system. The CPU 620 executes the application which requires texture-mapped three-dimensional images. The application loads the required texture maps from the texture library 610, then passes the graphics data to the rendered 630. The renderer generates the image and stores it in a frame buffer. The frame buffer is read by the display driver 640, which draws the image on the monitor 650.

According to a disclosed class of innovative embodiments, there is provided a method for generating a graphic image, comprising the steps of: receiving object data from a remote system; receiving a texture identifier from a remote system; locally obtaining texture data which corresponds to said texture identifier from a local storage; rendering a graphic image according to said object data and said texture data; wherein the number of bits in said texture identifier is less than the number of bits in said texture data.

According to another disclosed class of innovative embodiments, there is provided a method for exchanging graphics data, comprising the steps of: transmitting graphics object data, and a texture identifier which generally indicates a texture map but does not include the texture map, to a second computer system; receiving said object data and said texture identifier by said second computer system; referencing a texture library on said second system to determine a stored texture data which corresponds to said texture identifier; and displaying said graphics data using said object data and said stored texture data.

According to another disclosed class of innovative embodiments, there is provided: A method for exchanging graphics data, comprising the steps of: loading graphics object data, and a texture identifier which generally indicates a texture map but does not include the texture map, in a computer system; referencing a texture library on said computer system to determine a stored texture data which corresponds to said texture identifier; and displaying a texture mapped image using said object data and said stored texture data.

According to another disclosed class of innovative embodiments, there is provided a method for exchanging graphics data, comprising the steps of: decomposing said graphics data on a first computer system into object data and original texture data; referencing a first texture library on said first system to determine a texture identifier which corresponds to said texture data; transmitting said object data and said texture identifier to a second computer system; receiving said object data and said texture identifier by said second computer system; generating a reconstructed texture data which generally corresponds to said original texture data, using said texture identifier as a seed value; reconstructing said graphics data using said object data and said reconstructed texture data.

According to another disclosed class of innovative embodiments, there is provided a computer system comprising: display hardware; video generation hardware connected to generate graphics data for displaying on display hardware; a processor connected to said video generation hardware; a memory connected to said processor; a texture library stored in said memory, said library containing a set of texture maps, each of said texture maps having an associated texture identifier; wherein said video generation hardware generates said graphics data by mapping one or more of said texture maps on to one or more graphics objects, according to said associated texture identifiers; and wherein said the number of bits in said texture identifier is less than the number of bits in said texture map.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A method for generating a graphic image, comprising the steps of:

receiving object data from a remote system;

receiving a standard texture identifier from a remote system, but not receiving corresponding texture data;

locally obtaining a stored texture data which corresponds to said standard texture identifier from a local storage;

rendering a graphic image according to said object data and said stored texture data;

wherein the number of bits in said texture identifier is less than the number of bits in said texture data.

2. The method of claim 1, wherein said locally obtaining step retrieves a complete texture map from said local storage.

3. The method of claim 1, wherein said locally obtaining step includes a texture synthesis operation based on said standard texture indentifer.

4. A method for exchanging graphics data between a first computer system and a second computer system, comprising the steps of:

receiving object data from a remote system;

receiving a standard texture identifier from a remote system, but not receiving corresponding texture data;

locally obtaining a stored texture data which corresponds to said standard texture identifier from a local storage;

rendering a graphic image according to said object data and said stored texture data;

wherein the number of bits in said standard texture identifier is less than the number of bits in said stored texture data.

5. The method of claim 4, wherein said stored texture data is a default data which is not equivalent to said texture data.

6. A method for exchanging graphics data, comprising the steps of:

loading graphics object data, and a standard texture identifier which generally indicates a texture map, but not loading a corresponding texture map, in a computer system;

referencing a texture library on said computer system to determine a stored texture data which corresponds to said standard texture identifier; and displaying a texture mapped image using said object data and said stored texture data.

7. The method of claim 6, wherein said stored texture data is a default data which is not equivalent to said texture data.

8. The method of claim 6, further comprising, after said referencing step, the step of manipulating the orientation of said stored texture data.

9. A method for exchanging graphics data, comprising the steps of:

decomposing said graphics data on a first computer system into object data and original texture data;

referencing a first texture library on said first system to determine a standard texture identifier which corresponds to said original texture data;

transmitting said object data and said standard texture identifier, but not said original texture data, to a second computer system; receiving said object data and said standard texture identifier by said second computer system;

generating a reconstructed texture data which generally corresponds to said original texture data, using said standard texture identifier as a seed value;

reconstructing said graphics data using said object data and said reconstructed texture data.

10. The method of claim 9, wherein said stored texture data is a default data which is not exactly equivalent to said original texture data.

11. The method of claim 9, further comprising, after said generating step, the step of manipulating the orientation of said reconstructed texture data.

12. The method of claim 9, further comprising, after said generating step, the step of using a color look-up table to generate color values for said reconstructed texture data.

13. A computer system comprising: display hardware;

video generation hardware connected to generate graphics data for displaying on said display hardware;

a processor connected to said video generation hardware;

a memory connected to said processor;

a texture library stored in said memory, said library containing a set of texture maps, each of said texture maps having an associated standard texture identifier;

wherein said video generation hardware is connected to:

receive, from an application, object data and a first standard texture identifier which generally indicates a texture map, but not receiving said first standard texture identifier's corresponding texture map, retrieve, from said texture library but not from said application, one of said texture maps which is associated with said first standard texture identifier, and generate said graphics data by mapping said one of said texture maps which is associated with said first standard texture identifier on to one or more graphics objects.

14. The method of claim 13, further comprising a graphics pre-processing engine.

15. The method of claim 13, wherein said memory is a hard disk drive.

16. The method of claim 13, wherein said processor is an X86-compatible processor.

* * * * *